US010666113B2

(12) United States Patent
Snell et al.

(10) Patent No.: US 10,666,113 B2
(45) Date of Patent: May 26, 2020

(54) MAGNETIC BEARING MOTOR COMPRESSOR

(71) Applicant: JOHNSON CONTROLS TECHNOLOGY COMPANY, Auburn Hills, MI (US)

(72) Inventors: Paul W. Snell, York, PA (US); Ian Casper, York, PA (US); Jeb W. Schreiber, Stewartstown, PA (US); Daniela Bilmanis, New Carrollton, MD (US); Ajit Kane, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/182,410

(22) Filed: Nov. 6, 2018

(65) Prior Publication Data

US 2019/0074749 A1     Mar. 7, 2019

Related U.S. Application Data

(63) Continuation of application No. PCT/US2018/024104, filed on Mar. 23, 2018.
(Continued)

(51) Int. Cl.
*H02K 5/20* (2006.01)
*H02K 7/09* (2006.01)
(Continued)

(52) U.S. Cl.
CPC ............... *H02K 7/09* (2013.01); *F04D 17/10* (2013.01); *F04D 25/026* (2013.01); *F04D 25/06* (2013.01);
(Continued)

(58) Field of Classification Search
CPC .......................... F04D 25/0606; F04D 25/026
See application file for complete search history.

(56) References Cited

U.S. PATENT DOCUMENTS

| 5,682,071 A | 10/1997 | Tsuchiya et al. |
| 5,690,475 A | 11/1997 | Yamada et al. |
(Continued)

FOREIGN PATENT DOCUMENTS

| CN | 103821735 A | 5/2014 |
| CN | 206035859 U | 3/2017 |
(Continued)

OTHER PUBLICATIONS

International Search Report and Written Opinion on International Patent Application No. PCT/US2018/024104 dated Jun. 28, 2018. 16 pages.
(Continued)

*Primary Examiner* — Filip Zec
(74) *Attorney, Agent, or Firm* — Foley & Lardner LLP

(57) ABSTRACT

A sealed induction motor for a chiller assembly is provided. The induction motor includes a stator, a rotor, and a shaft with a first end and a second end. The rotor and the shaft are configured to rotate relative to the stator. The induction motor further includes a first magnetic bearing assembly located proximate the first end of the shaft and a second magnetic bearing assembly located proximate the second end of the shaft. The first and the second magnetic bearing assemblies are configured to support the shaft. The shaft is coupled to a centrifugal compressor using a direct drive connection.

14 Claims, 3 Drawing Sheets

Related U.S. Application Data

(60) Provisional application No. 62/476,343, filed on Mar. 24, 2017, provisional application No. 62/612,065, filed on Dec. 29, 2017.

(51) Int. Cl.
   | | |
   |---|---|
   | *F04D 29/058* | (2006.01) |
   | *F04D 25/06* | (2006.01) |
   | *F04D 17/10* | (2006.01) |
   | *F04D 25/02* | (2006.01) |
   | *F16C 32/04* | (2006.01) |
   | *F25B 31/02* | (2006.01) |
   | *H02K 5/124* | (2006.01) |
   | *H02K 7/14* | (2006.01) |
   | *H02K 9/19* | (2006.01) |
   | *H02K 17/16* | (2006.01) |

(52) U.S. Cl.
   CPC ....... *F04D 25/0606* (2013.01); *F04D 29/058* (2013.01); *F16C 32/048* (2013.01); *F16C 32/0497* (2013.01); *F25B 31/026* (2013.01); *H02K 5/124* (2013.01); *H02K 5/20* (2013.01); *H02K 7/14* (2013.01); *H02K 9/19* (2013.01); *H02K 17/16* (2013.01)

(56) References Cited

U.S. PATENT DOCUMENTS

| | | | |
|---|---|---|---|
| 5,924,847 A | 7/1999 | Scaringe et al. | |
| 5,924,874 A | 7/1999 | Gotoh et al. | |
| 7,071,650 B2 | 7/2006 | Ilda et al. | |
| 7,102,264 B2 | 9/2006 | Yanashima et al. | |
| 7,442,017 B2 | 10/2008 | Buhler et al. | |
| 8,022,588 B2 | 9/2011 | Yoshino et al. | |
| 8,067,865 B2 * | 11/2011 | Savant | H02K 5/20 310/52 |
| 8,319,388 B2 | 11/2012 | Yoshino et al. | |
| 8,424,339 B2 | 4/2013 | Sommer et al. | |
| 8,616,855 B2 | 12/2013 | Burchill et al. | |
| 8,681,496 B2 * | 3/2014 | Dede | H05K 7/20172 361/679.48 |
| 8,723,388 B2 | 5/2014 | Tsutsumi et al. | |
| 8,740,584 B2 | 6/2014 | Yoshino et al. | |
| 8,912,701 B2 | 12/2014 | Tsutsumi et al. | |
| 9,212,667 B2 | 12/2015 | Sun et al. | |
| 2002/0140309 A1 | 10/2002 | Yanashima et al. | |
| 2002/0184905 A1 | 12/2002 | Benedict et al. | |
| 2003/0071533 A1 | 4/2003 | Kikuchi et al. | |
| 2003/0084888 A1 * | 5/2003 | LeBold | F04D 25/024 123/599 |
| 2004/0084984 A1 | 5/2004 | Toshihito et al. | |
| 2005/0158172 A1 | 7/2005 | Snyder et al. | |
| 2007/0007830 A1 * | 1/2007 | Reisch | H02K 7/006 310/54 |
| 2009/0010776 A1 | 1/2009 | Tsuchiya et al. | |
| 2010/0158721 A1 | 6/2010 | Yanase et al. | |
| 2013/0033148 A1 * | 2/2013 | Vetter | H02K 1/185 310/216.113 |
| 2013/0039786 A1 | 2/2013 | Sun et al. | |
| 2013/0129541 A1 * | 5/2013 | Flanary | A61M 16/1075 417/420 |
| 2013/0294939 A1 * | 11/2013 | Gilarranz | F04D 17/12 417/53 |
| 2014/0125269 A1 | 5/2014 | Kalluf et al. | |
| 2014/0234139 A1 | 8/2014 | Sakawaki et al. | |
| 2014/0363321 A1 | 12/2014 | Sakawaki et al. | |
| 2015/0107289 A1 | 4/2015 | Sun et al. | |
| 2015/0125323 A1 | 5/2015 | Stair et al. | |
| 2015/0233422 A1 | 8/2015 | Irino et al. | |
| 2015/0236574 A1 | 8/2015 | Ono et al. | |
| 2016/0172940 A1 * | 6/2016 | Weis | H02K 5/20 310/43 |
| 2016/0201686 A1 * | 7/2016 | Vogt | F04D 17/105 417/423.7 |
| 2016/0298680 A1 | 10/2016 | Huang et al. | |
| 2017/0146271 A1 * | 5/2017 | Hasegawa | F04D 29/058 |

FOREIGN PATENT DOCUMENTS

| | | |
|---|---|---|
| DE | 102007060654 A1 | 6/2009 |
| EP | 2677176 A1 | 12/2013 |
| WO | WO-2013/012491 A1 | 1/2013 |
| WO | WO-2014/084989 A2 | 6/2014 |
| WO | WO-2015/160881 A1 | 10/2015 |
| WO | WO-2017/027701 A1 | 2/2017 |

OTHER PUBLICATIONS

Office Action on Taiwanese Patent Application No. 107110147 dated Jan. 4, 2019. 11 pages.

Search Report on Taiwanese Patent Application No. 107110147 dated Jan. 4, 2019. 1 page.

Taiwanese Office Action for Taiwan Application No. TW 107110147 dated Aug. 1, 2019, 9 pages.

* cited by examiner

MAGNETIC BEARING MOTOR COMPRESSOR

CROSS-REFERENCE TO RELATED PATENT APPLICATIONS

This application is a continuation of International Patent Application No. PCT/US2018/024104, filed Mar. 23, 2018, which claims the benefit of and priority to U.S. Provisional Application No. 62/612,065, filed Dec. 29, 2017, and U.S. Provisional Application No. 62/476,343, filed Mar. 24, 2017. The entire disclosure of each application is incorporated by reference herein.

BACKGROUND

The present disclosure relates generally to a high speed semi-hermetically-sealed induction motor that directly drives the centrifugal compressor of a chiller assembly. Some centrifugal compressors utilize medium pressure (MP) refrigerant, magnetic bearings, and a high speed permanent magnet motor. However, high speed permanent magnet motors often require the use of expensive rare-earth materials and a specialized variable speed drive (VSD). Impellers used with medium pressure refrigerants tend to operate at high speeds in order to achieve the required pressure rise. Utilizing low pressure (LP) refrigerant allows for the use of larger diameter impellers and, subsequently, slower operating speeds. The lower operating speed of a LP centrifugal compressor can permit the use of high-speed direct drive induction motors and a simplified VSD. The combination of induction motor technology and simplified VSDs can provide similar performance to permanent magnet motors at a reduced cost.

SUMMARY

One implementation of the present disclosure is a sealed induction motor for a chiller assembly. The induction motor includes a stator, a rotor, and a shaft with a first end and a second end. The rotor and the shaft are configured to rotate relative to the stator. The induction motor further includes a first magnetic bearing assembly located proximate the first end of the shaft and a second magnetic bearing assembly located proximate the second end of the shaft. The first and the second magnetic bearing assemblies are configured to support the shaft and associated loads. The shaft is coupled to a centrifugal compressor using a direct drive connection.

In some embodiments, the centrifugal compressor utilizes a low pressure refrigerant having an operating pressure of less than 400 kPa. In other embodiments, the low pressure refrigerant is R1233zd.

In some embodiments, the first magnetic bearing assembly and the second magnetic bearing assembly include radial magnetic bearing assemblies configured to support the shaft in a radial direction. The induction motor includes a third magnetic bearing assembly configured to support the shaft in an axial direction. In other embodiments, the first, second, and third magnetic bearing assemblies are active magnetic bearing assemblies.

Another implementation of the present disclosure is a vapor compression system. The vapor compression system includes a centrifugal compressor directly driven by a sealed induction motor, a condenser, an expansion device, and an evaporator connected in a closed refrigerant loop. The sealed induction motor includes a stator, a rotor, and a shaft with a first end and a second end. The rotor and the shaft are configured to rotate relative to the stator. The sealed induction motor further includes a first radial magnetic bearing assembly located proximate the first end of the shaft, a second radial magnetic bearing assembly located proximate the second end of the shaft, and a thrust magnetic bearing assembly. The first and second radial magnetic bearing assemblies are configured to support the shaft in a radial direction, while the thrust magnetic bearing assembly is configured to support the shaft in an axial direction.

In some embodiments, the centrifugal compressor is a single-stage compressor with an inlet, an impeller, a diffuser, and a collector or scroll assembly.

In some embodiments, the centrifugal compressor utilizes a low pressure refrigerant having an operating pressure of less than 400 kPa. In other embodiments, the low pressure refrigerant is R1233zd.

In some embodiments, the thrust magnetic bearing assembly is located between the first radial magnetic bearing assembly and the second radial magnetic bearing assembly.

Yet another implementation of the present disclosure is an induction motor for a chiller assembly. The induction motor includes a stator having a cylindrical shape, and a rotor coupled to a shaft. The rotor and the shaft are configured to rotate relative to the stator. The induction motor further includes magnetic bearing assemblies configured to support the rotor and a housing configured to at least partially encapsulate the stator, the rotor, the shaft, and the magnetic bearing assemblies. The stator is coupled to the motor housing using a clearance fit. The clearance fit is configured to prevent distortion of the cylindrical shape.

In some embodiments, the shaft is coupled to a centrifugal compressor. The centrifugal compressor includes an inlet, an impeller, a diffuser, and a scroll assembly. In other embodiments, the shaft is configured to drive the impeller via a direct drive connection. In further embodiments, the centrifugal compressor utilizes a low pressure refrigerant having an operating pressure of less than 400 kPa. In still further embodiments, the low pressure refrigerant is R1233zd.

In some embodiments, the first magnetic bearing assembly includes a radial magnetic bearing assembly or a thrust magnetic bearing assembly. In some embodiments, the induction motor includes a second magnetic bearing assembly and a third magnetic bearing assembly. In other embodiments, the first, second, and third magnetic bearing assemblies comprise active magnetic bearing assemblies

DETAILED DESCRIPTION

Figure 1:
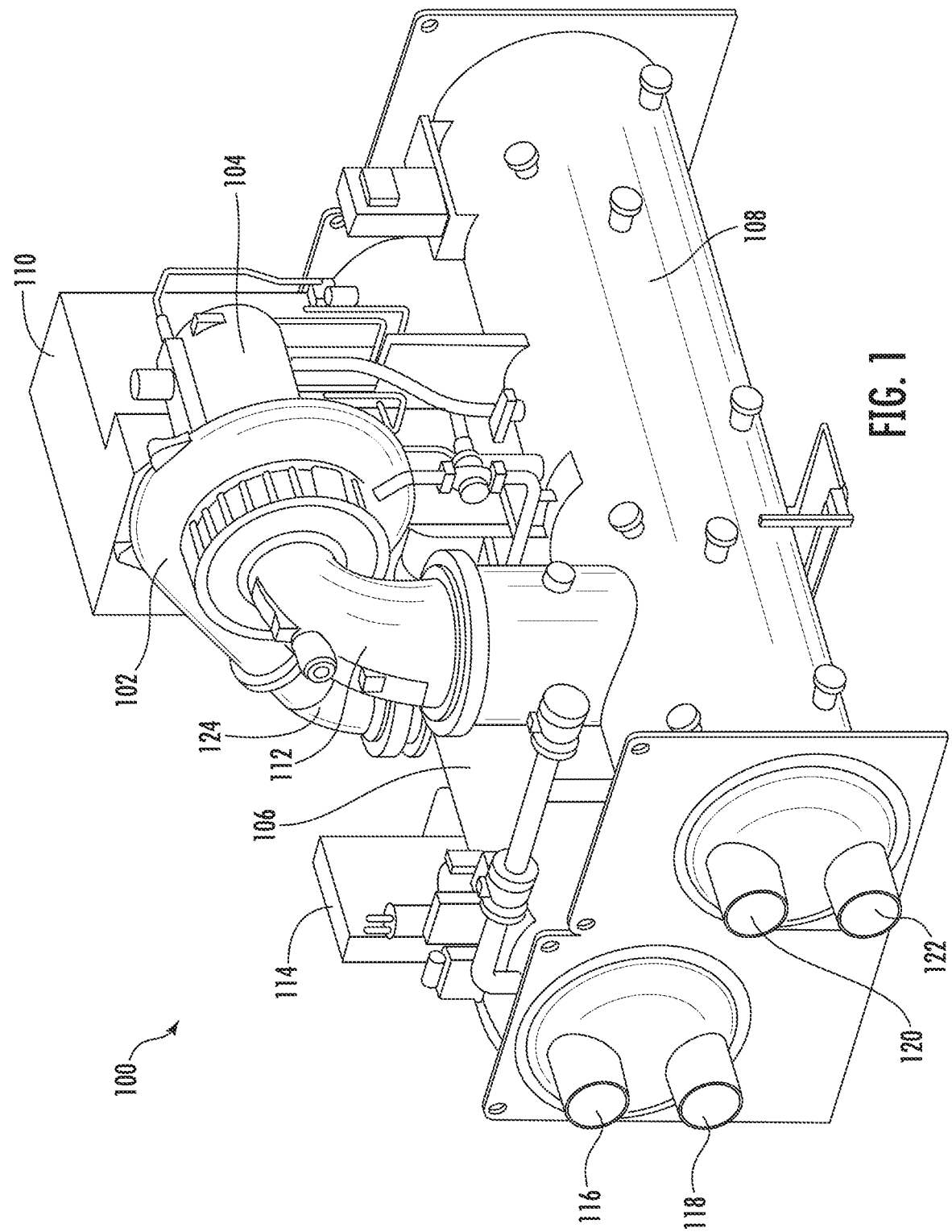
FIG. 1 is a perspective view drawing of a chiller assembly, according to some embodiments.
Figure 2:
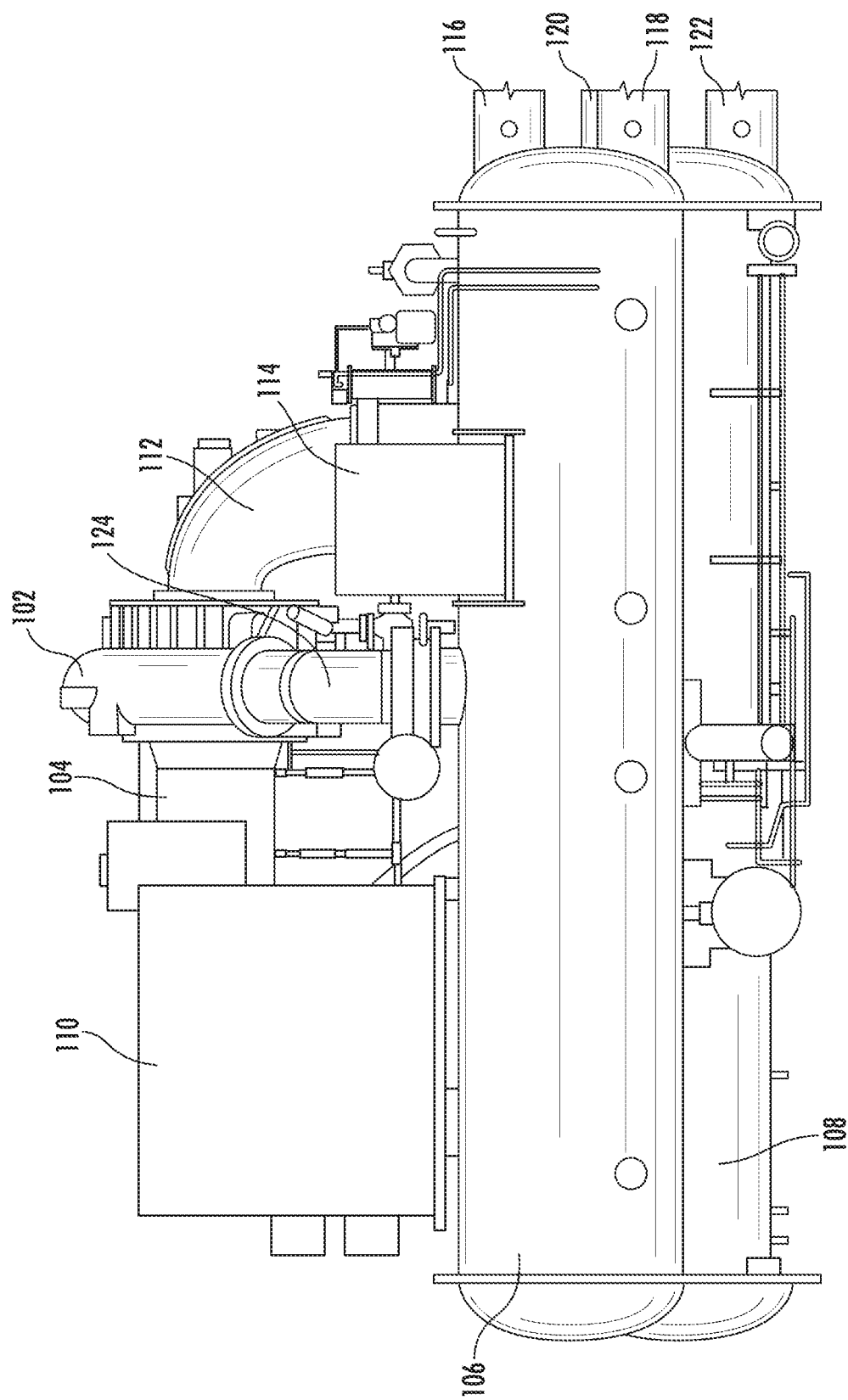
FIG. 2 is a front elevation view drawing of the chiller assembly of FIG. 1, according to some embodiments.

Referring generally to the FIGURES, a chiller assembly having a centrifugal compressor with a magnetic bearing motor compressor is shown. Referring to FIGS. 1-2, an example implementation of a chiller assembly 100 is depicted. Chiller assembly 100 is shown to include a compressor 102 driven by a motor 104, a condenser 106, and an evaporator 108. A refrigerant is circulated through chiller assembly 100 in a vapor compression cycle. Chiller assembly 100 can also include a control panel 114 to control operation of the vapor compression cycle within chiller assembly 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. Compressor 102 can be a centrifugal compressor, a screw compressor, a scroll compressor, or any other type of suitable compressor. In the example described in FIG. 2, compressor 102 is a centrifugal compressor.

Evaporator 108 includes an internal tube bundle (not shown), a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered from evaporator 108 by compressor 102 to condenser 106 transfers heat to a fluid. Refrigerant vapor condenses to refrigerant liquid in condenser 106 as a result of heat transfer with the fluid. The refrigerant liquid from condenser 106 flows through an expansion device and is returned to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

Figure 3:
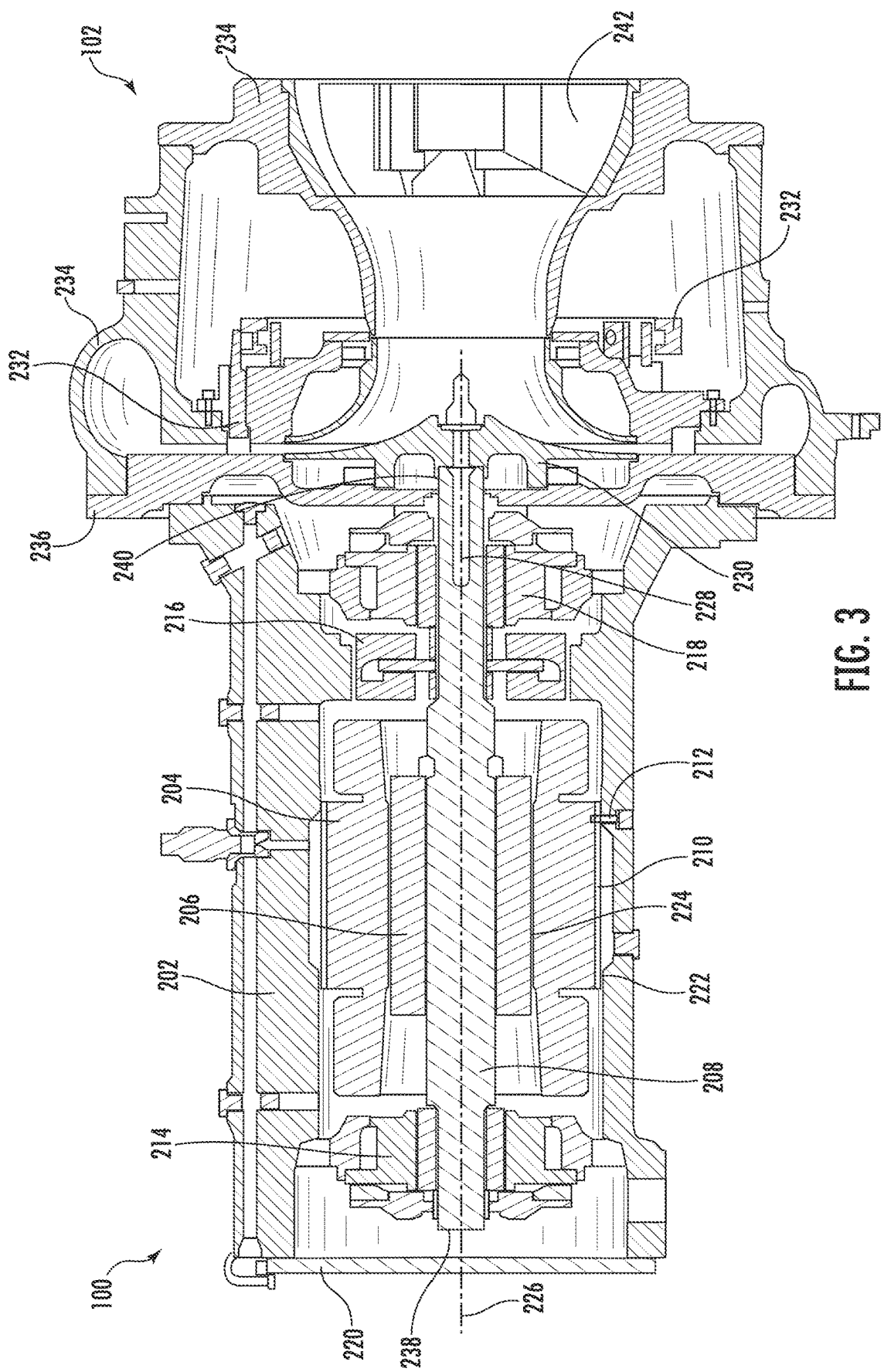
FIG. 3 is a sectional view drawing of the high-speed induction motor and centrifugal compressor of the chiller assembly of FIG. 1, according to some embodiments.

Referring now to FIG. 3, a sectional view of a high speed induction motor utilized to drive a centrifugal compressor is shown. In some embodiments, the high speed induction motor is substantially similar to motor 104, and the centrifugal compressor is substantially similar to compressor 102, both described above with reference to FIG. 1. Motor 104 is shown to include among other components, an enclosure or housing 202, a stator 204, and a rotor 206. The stator 204 is the stationary part of the motor's electromagnetic circuit that imparts radial and axial magnetic forces on the rotor 206. In a properly aligned system, the sum of these forces is zero, or nearly zero. In some embodiments, the stator 204 is partially encapsulated by a motor jacket 210, and both the stator 204 and the motor jacket 210 may have a substantially cylindrical shape. The motor jacket 210 may be constructed from aluminum and may be configured to optimize heat transfer from the stator 204 to prevent overheating of the motor 104.

The rotor 206 is the rotating part of the motor's electromagnetic circuit. In various embodiments, the rotor 206 may be a squirrel-cage rotor, a wound rotor, a salient-pole rotor, or a cylindrical rotor. The rotor 206 is coupled to a shaft 208. The shaft 208 is shown to include a first end 238 and a second end 240. The rotor 206 and the shaft 208 collectively rotate about a central axis 226 in order to transmit torque and rotation to other components and/or assemblies coupled to the motor 104.

As shown in FIG. 3, the second end 240 of the shaft 208 is coupled to an impeller 230 of the centrifugal compressor 102 using a direct drive connection 228. In some embodiments, the direct drive connection 228 may include a mechanical fastener (e.g., a bolt, a pin) used to couple the shaft 208 to the impeller 230. Directly-driven systems provide advantages over gear-driven systems because they decrease friction losses and require fewer, simpler components. In addition to the impeller 230, the centrifugal compressor 102 can include, among other components, an inlet 242, a diffuser assembly comprised of a variable geometry diffuser (VGD) 232 and a diffuser plate 236, and a collector or scroll assembly 234. The inlet 242 can include a pipe that draws fluid (e.g., the LP refrigerant) to the impeller 230, which is a rotating set of vanes that gradually impart kinetic energy to the vapor. Downstream of the impeller 230 is the diffuser gap formed by the VGD 232 and the diffuser plate 236. The kinetic energy of the vapor is converted into pressure energy as it flows and expands through the diffuser gap and before it exits the centrifugal compressor via the collector or scroll assembly 234.

In some embodiments, the LP refrigerant has an operating pressure of less than 400 kPa or approximately 58 psi. In further embodiments, the LP refrigerant is R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

Some induction motors utilize an interference fit to retain the stator within the housing. In an interference fit, the stator can be heated until thermal expansion creates a clearance between the inside diameter of the motor housing and the outside diameter of the stator. In other embodiments, the stator is cooled until the stator contracts and a clearance is created between the motor housing and the stator. Once stator is inserted into the housing and both the housing and the stator reach an equilibrium temperature, the clearance between the housing and the stator diminishes to zero. However, as the thermal expansion rates of the housing and the stator may not be identical, this return to equilibrium temperature can cause distortions in the shape (e.g., the circularity) of the stator. A distorted stator caused by an interference fit can lead to unbalanced magnetic forces on the rotor. When the system is improperly aligned such that the sum of the forces exerted by the stator on the rotor is nonzero, designers must overspecify bearing assemblies (i.e., they must select magnetic bearings with oversized components) in order to not exceed the rotor positioning capabilities of the magnetic bearing assemblies.

Thus, as depicted in FIG. 3, a clearance region 222 is maintained between the motor jacket 210 of the stator 204 and the motor housing 202 to avoid imperfect circularity of the housing 202 from distorting the circularity of the stator. To prevent displacement and/or rotation of the motor jacket 210 and the stator 204 relative to the motor housing 202, a locating pin 212 or key may be inserted through the housing 202 and the motor jacket 210, and retained within the stator 204. In order to minimize unbalanced magnetic forces, it is important for the stator 204 and rotor 206 to be concentric and the air gap 224, depicted in FIG. 3, between the stator and rotor be maintained as a true cylindrical feature. The clearance region 222 between the motor jacket 210 and the motor housing 202 may be controlled such that deviations in the air gap 224 never exceeds 10% of the nominal clearance. Nominal clearance may be defined as perfectly concentric alignment between the stator 204 and the rotor 206 along central axis 226.

The motor 104 is also shown to include magnetic bearing assemblies 214, 216 and 218 that support the rotor 206 and shaft 208 and permit rotation of the rotor 206 and shaft 208 relative to the stator 204. Magnetic bearing assemblies support a load using magnetic levitation, and thus permit relative motion with very low friction and little or no mechanical wear. In some embodiments, magnetic bearing assemblies 214, 216, and 218 are active magnetic bearing (AMB) assemblies. AMB assemblies utilize electromagnetic actuators with continuously adjusted current values to keep the rotor 206 and shaft 208 in a desired position and achieve stable levitation.

The magnetic bearing assemblies 214 and 218 may be radial bearing assemblies configured to control the position of the shaft 208 in a radial direction (i.e., perpendicular to central axis 226), while magnetic bearing assembly 216 may be a thrust bearing assembly configured to control the position of the shaft 208 in an axial direction (i.e., parallel to central axis 226). In some embodiments, radial magnetic bearing assembly 214 may be located proximate the first end 238 of the shaft 208, while radial magnetic bearing assembly 218 may be located proximate the second end 240 of the shaft 208. Thrust magnetic bearing assembly 216 may be located between radial bearing assemblies 214 and 218, and near the second end 240 of the shaft 208 and the impeller 230. By locating the thrust magnetic bearing assembly 216 near the impeller 230, when heat caused by the operation of the motor 104 causes the shaft 208 to expand, the proximity of the thrust magnetic bearing assembly 216 permits precise alignment of the impeller 230 within the compressor diffuser to achieve an optimized aerodynamic performance.

As described above, motor 104 may be semi-hermetically sealed. A hermetic or semi-hermetically sealed motor 104 may refer to a motor that is exposed to the environment inside the compressor assembly 102 (i.e., such that the motor may be cooled by the refrigerant circulating through the chiller assembly). By contrast, a motor that is not designed to be hermetic or semi-hermetic may be enclosed in a separate housing, and connected to a compressor via a shaft coupling and shaft seal. Motor 104 may be considered semi-hermetically sealed as end plate 220 may be detachably fastened to the housing 202 through the use of mechanical fasteners and seals (e.g., bolts, o-rings). In comparison, a fully hermetically sealed compressor is one which encapsulates the motor and may include a welded enclosure.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. An induction motor for a chiller assembly, the induction motor comprising:
    a stator having a tubular shape;
    a rotor coupled to a shaft, the rotor and the shaft configured to rotate relative to the stator;
    a first magnetic bearing assembly configured to support the rotor; and
    a housing configured to at least partially encapsulate the stator, the rotor, the shaft, and the first magnetic bearing assembly;
    wherein the stator is coupled to the housing using a clearance fit configured to prevent distortion of the tubular shape, and wherein a first clearance between the housing and a motor jacket coupled to the stator is controlled such that deviations in a second clearance between the stator and the rotor do not exceed ten percent of a nominal clearance value.

2. The induction motor of claim 1, wherein the shaft is coupled to a centrifugal compressor, the centrifugal compressor comprising an inlet, an impeller, a diffuser, and a scroll assembly.

3. The induction motor of claim 2, wherein the shaft is configured to drive the impeller via a direct drive connection.

4. The induction motor of claim 2, wherein the first magnetic bearing assembly comprises a thrust magnetic bearing assembly.

5. The induction motor of claim 4, wherein the thrust magnetic bearing assembly is located proximate the impeller.

6. The induction motor of claim 1, wherein the induction motor further comprises a second magnetic bearing assembly and a third magnetic bearing assembly.

7. The induction motor of claim 1, wherein the centrifugal compressor utilizes a low pressure refrigerant having an operating pressure of less than 400 kPa.

8. The induction motor of claim 7, wherein the low pressure refrigerant is R1233zd.

9. The induction motor of claim 1, wherein the motor jacket is fabricated from aluminum.

10. An induction motor for a chiller assembly, the induction motor comprising:
    a stator having a cylindrical shape;
    a motor jacket having a cylindrical shape, the motor jacket configured to at least partially encapsulate the stator;
    a rotor coupled to a shaft, the rotor and the shaft configured to rotate about a central axis relative to the stator and the motor jacket;
    a first magnetic bearing assembly configured to support the rotor; and
    a housing configured to at least partially encapsulate the stator, the motor jacket, the rotor, the shaft, and the first magnetic bearing assembly;
    wherein a first clearance between the housing and the motor jacket is controlled such that deviations in a second clearance between the stator and the rotor do not exceed a threshold clearance value.

11. The induction motor of claim 10, wherein the threshold clearance value is ten percent of a nominal clearance, wherein the nominal clearance is defined by concentric alignment of the stator and the rotor along the central axis.

12. The induction motor of claim 10, wherein the motor jacket is fabricated from aluminum.

13. The induction motor of claim 10, wherein the first magnetic bearing assembly comprises at least one of a radial magnetic bearing assembly and a thrust magnetic bearing assembly.

14. The induction motor of claim 10, further comprising a second magnetic bearing assembly and a third magnetic bearing assembly.

\* \* \* \* \*